Patented Jan. 9, 1951

2,537,876

UNITED STATES PATENT OFFICE 2,537,876

N-ARYLTHIAZOLO MONOMETHINE CYANINE DYES

Leslie G. S. Brooker and Frank L. White, Rochester, N. Y., assignors to Eastman Kodak Company, Rochester, N. Y., a corporation of New Jersey No Drawing. Application January 2, 1948, Serial No. 366

7 Claims. (Cl. 260—240.7)

This invention relates to N-arylthiazolo monomethine cyanine dyes and to a process for preparing the same.

A number of dyes which are classified as cyanine dyes have been prepared. Almost all of these dyes contain alkyl groups attached to the nitrogen atoms of two heterocyclic nuclei, the nitrogen atoms being linked together by a conjugated chain of carbon atoms. Very few cyanine dyes, however, have been prepared where aryl groups, rather than alkyl groups, are attached to the aforesaid nitrogen atoms.

Evans and Smiles (J. Chem. Soc. 1935, 1263) prepared 3,3'-di-o-nitrophenylthiacarbocyanine iodide from 2-methylbenzothiazole o-nitrophen-iodide. However, not until 2-methylbenzothiazole pheniodide was made available (Brooker and Williams United States Patent 2,330,203, dated September 28, 1943) was it possible to obtain N-phenyl cyanine dyes wherein the phenyl group was devoid of nitro groups. From 2-methylbenzothiazole pheniodide and ethyl orthoformate Brooker and Williams were able to synthesize 3,3'-diphenylthiacarbocyanine iodide and other cyanine dyes containing the N-phenylbenzothiazole nucleus.

More recently Brooker discovered a method for preparing 2-methyl-3-phenylthiazolinium salts and 2-methyl-3-naphthylthiazolinium salts, and from these salts was able to prepare a number of cyanine dyes, e. g. 3,3'-diphenylthiazolinocarbocyanine and 3,3'-di-(α-naphthyl)thiazolinocarbocyanine salts (see the copending application of Leslie G. S. Brooker, Serial No. 622,677, filed October 16, 1945, now U. S. Patent 2,441,558 dated May 18, 1948) and other cyanine dyes containing a N-phenylthiazoline or a N-Naphthylthiazoline nucleus.

In each of these prior cases, special methods have had to be employed to arrive at the N-aryl dyes. Now by a further and entirely different special method, we have been able to produce N-arylthiazolo monomethine cyanine dyes.

It is accordingly an object of our invention to provide new dyes. A further object is to provide a method for preparing these dyes. A still further object is to provide photographic emulsions sensitized with these new dyes. Other objects will become apparent hereinafter.

The N-arylthiazolo monomethine cyanine dyes of our invention can be represented by the following general formula:

I

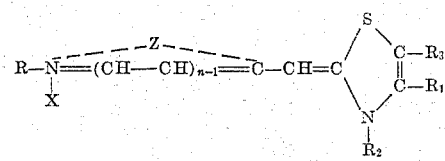

wherein R represents an alkyl group, i. e. an alcohol radical, e. g. methyl, ethyl, n-propyl, n-butyl, isobutyl, n-amyl, isoamyl, β-hydroxyethyl, γ-hydroxypropyl, β-methoxyethyl, β-ethoxyethyl, allyl, benzyl (phenylmethyl), β-phenylethyl, β-carboxyethyl, carboxymethyl, α-carboxyethyl, γ-carboxypropyl, β-acetoxyethyl, γ-acetoxypropyl, carbmethoxymethyl, carbethoxymethyl, β-carbmethoxyethyl, β-carbethoxyethyl, etc., $n$ represents a positive integer of from 1 to 2, $R_2$ represents an aryl group, e. g. phenyl, α-naphthyl, β-naphthyl, m-tolyl, p-tolyl, o-tolyl, etc., $R_1$ represents a member selected from the group consisting of an alkyl group and an aryl group, e. g. methyl, ethyl, benzyl, phenyl, α-naphthyl, p-chlorophenyl, p-methoxyphenyl, p-tolyl, etc., $R_3$ represents a member selected from the group consisting of a hydrogen atom, an alkyl group and an aryl group, e. g. methyl, carboxymethyl, phenyl, etc., X represents an anion, e. g. chloride, bromide, iodide, acetate, propionate, butyrate, perchlorate, thiocyanate, etc., and Z represents the non-metallic atoms necessary to complete a heterocyclic nucleus selected from the group consisting of heterocyclic nuclei of the benzothiazole series, heterocyclic nuclei of the benzoselenazole series, heterocyclic nuclei of the α-naphthothiazole series, heterocyclic nuclei of the β-naphthothiazole series, heterocyclic nuclei of the quinoline series, heterocyclic nuclei of the thiazoline series, heterocyclic nuclei of the thiazole series and heterocyclic nuclei of the 3,3-dimethylindolenine series. More specifically, Z represents the non-metallic atoms necessary to complete a heterocyclic nucleus such as the benzothiazole, the 4-chlorobenzothiazole, the 5-chlorobenzothiazole, the 6-chlorobenzothiazole, the 7-chlorobenzothiazole, the 4-methylbenzothiazole, the 5-methylbenzothiazole, the 6-methylbenzothiazole, the 5-bromobenzothiazole, the 6-bromobenzothiazole, the 5-iodobenzothiazole, the 6-iodobenzothiazole, the 4-phenylbenzothiazole, the 5-phenylbenzothiazole, the 4-methoxybenzothiazole, the 5-methoxybenzothiazole, the 6-methoxybenzothiazole, the tetrahydrobenzothiazole, the 5,6-dimethoxybenzothiazole, the 4-ethoxybenzothiazole, the 5-ethoxybenzothiazole, tetrahydrobenzoselenazole, the benzoselenazole, the 5-chlorobenzoselenazole, the α-naphthothiazole, the β-naphthothiazole, the quinoline, the 6-methoxyquinoline, the 6-ethoxyquinoline, the 6-methylquinoline, the 7-methylquinoline, the 8-methylquinoline, the 6-chloroquinoline, the 8-chloroquinoline, the 4-chloroquinoline, the 7-ethoxyquinoline, the 6-methoxyquinoline, the thiazole, the 4-methylthiazole, the 4-phenylthiazole, the 5-methylthiazole, the 5-phenylthiazole, the 4,5-diphenylthiazole, the 4-(2-thienyl)thiazole, the thiazoline and the 3,3-dimethylindolenine nuclei. When Z represents the non-metallic atoms necessary to complete a benzothiazole or thiazoline nucleus, R also represents an aryl group, e. g. phenyl.

We prepare the new dyes represented by Formula I above by condensing a halogenoketone selected from those represented by the following general formula:

II
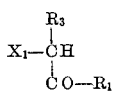

wherein $R_1$ and $R_3$ have the values given above, $X_1$ represents a halogen atom, e. g. a chlorine atom, a bromine atom or an iodine atom, with a compound selected from those represented by the following general formula:

III
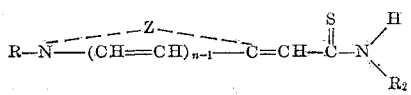

wherein R, $R_2$, $n$ and Z have the values set forth above.

The condensations are accelerated by heat and are advantageously carried out in a diluent, e. g. a low molecular weight alcohol, such as methyl, ethyl, n-propyl, isopropyl, n-butyl or isobutyl alcohol.

Among the halogenoketones represented by Formula II, the bromoketones are advantageously employed. Typical of the halogenoketones are phenacyl bromide, phenacyl chloride, phenacyl iodide, p-chlorophenacyl bromide, p-bromophenacyl bromide, p-chlorophenacyl iodide, chloromethyl p-tolyl ketone, bromomethyl p-tolyl ketone, iodomethyl p-tolyl ketone, chloromethyl α-naphthyl ketone, bromomethyl p-methoxyphenyl ketone, bromoacetone, bromomethyl ethyl ketone, bromomethyl propyl ketone, chloromethyl benzyl ketone, α-bromoethyl phenyl ketone, α-bromoethyl p-chlorophenyl ketone, α-bromobenzyl phenyl ketone, α-bromo-β-carboxyethyl phenyl ketone (β-bromo-β-benzoylpropionic acid), etc.

The compounds represented by Formula III above are described in our copending application Serial No. 368, filed of even date herewith, and are prepared by condensing an arylisothiocyanate with a cyclammonium quaternary salt containing a reactive methyl group, advantageously in the presence of a basic tertiary organic amine. Typical of these compounds of Formula III are: 2-(2-anilino-2-thioethylidene)-3-ethylbenzothiazoline, 2-(2-anilino-2-thioethylidene)-1-ethyl-β-naphthothiazoline, 2-(2-anilino-2-thioethylidene)-3-ethylbenzoselenazoline, 2-(2-anilino-2-thioethylidene)-1-ethyl-1,2-dihydroquinoline, 2-(2-anilino-2-thioethylidene)-3-ethyl-4-methyl-4-thiazoline, 2-(2-anilino-2-thioethylidene)-3-methylthiazolidine, 2-(2-anilino-2-thioethylidene)-1,3,3-trimethylindoline, 4-(2-anilino-2-thicethylidene)-1-methyl-1,4-dihydroquinoline, etc.

The following examples will serve to illustrate further the manner of obtaining our new dyes.

*Example 1.—3 - ethyl-3',4'-diphenylthiathiazolocyanine iodide*

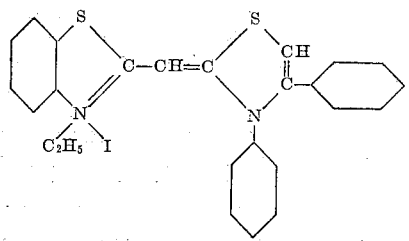

1.56 g. (1 mol.) of 2-(2-anilino-2-thioethylidene)-3-ethylbenzothiazoline and 1.0 g. (1 mol.) of phenacyl bromide were heated together in 10 cc. of absolute ethyl alcohol at the refluxing temperature for 15 minutes. The hot reaction mixture was treated with a hot aqueous solution of potassium iodide (3 g.). The mixture was chilled at 0° C., the solid material was collected on a filter and washed with water. The solid material collected on the filter was stirred with hot acetone. After chilling the acetone suspension, the solid dye was filtered off and washed on the filter with acetone. The yield of dye was 50 per cent crude and 22 per cent after two recrystallizations from ethyl alcohol (50 cc. per gram of dye). The light orange crystals had M. P. 271–272° C. with decomposition. The dye sensitized a photographic gelatino-silver-chloride emulsion to about 500 mμ with maximum sensitivity at about 450 mμ.

*Example 2.—3 - ethyl - 3',4',-diphenylselenathiozolocyanine bromide*

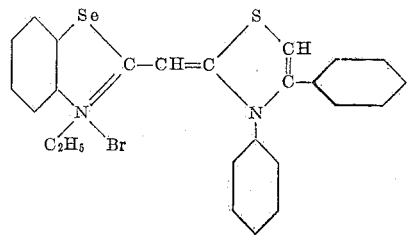

1.80 g. (1 mol.) of 2-(2-anilino-2-thioethylidene)-3-ethylbenzoselenazoline and 1.99 g. (1 mol. + 100 per cent excess) of phenacyl bromide were heated together at the temperature of the steam bath for one hour. The cool reaction mixture was extracted with several portions of diethyl ether. The residue was stirred with hot acetone. After chilling the acetone mixture at 0° C., the dye was collected on a filter and washed with acetone. The yield of dye was 92 per cent crude and 59 per cent after two recrystallizations from ethyl alcohol (85 cc. per gram of dye). The yellow crystals had M. P. above 310° C., and they sensitized a photographic gelatino-silver-chlorobromide emulsion to some extent to about 500 mμ with maximum sensitivity at about 460 mμ.

*Example 3.—5-chloro-3-ethyl-3',4'-diphenylthiathiazolocyanine bromide*

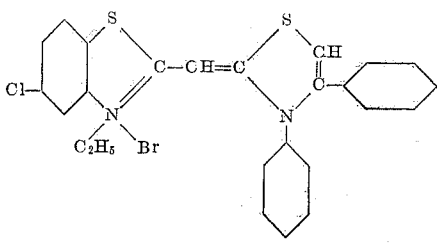

1.73 g. (1 mol.) of 2-(2-anilino-2-thioethylidene)-5-chloro-3-ethylbenzothiazoline and 1.99 g. (1 mol. + 100% excess) of phenacyl bromide were heated together at the temperature of the steam bath for one hour. The cool reaction mixture was extracted with several portions of diethyl ether. The residue was stirred with hot acetone. After chilling the acetone mixture at 0° C., the dye was collected on a filter and washed with acetone. The yield of dye was 89 per cent crude and 57 per cent after two recrystallizations from ethyl alcohol (25 cc. per gram of dye). The yellow crystals had M. P. 298–299° C. with decomposition. They sensitized a photographic gela-

*Example 4.—3 - ethyl - 3',4'-diphenyl-4,5-benzothiathiazolocyanine bromide*

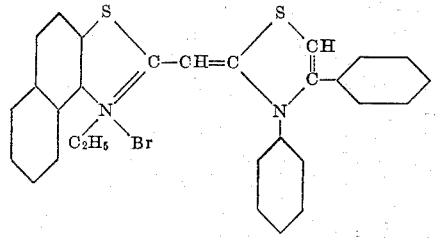

1.81 g. (1 mol.) of 2-(2-anilino-2-thioethylidene)-1-ethyl-β-naphthothiazoline and 1 g. (1 mol.) of phenacyl bromide in 10 cc. of ethyl alcohol were heated together at the refluxing temperature for 25 minutes. After chilling at 0° C., the dye was collected on a filter and washed with acetone. The yield of dye was 92 per cent crude and 53 per cent after two recrystallizations from ethyl alcohol (25 cc. per gram of dye). The yellow needles had M. P. 240–241° C. with decomposition. They sensitized a photographic gelatino-silver-chlorobromide emulsion to about 510 mμ with maximum sensitivity at about 465 mμ.

*Example 5.—1'-ethyl-3,4-diphenylthiazolo-2'-cyanine bromide*

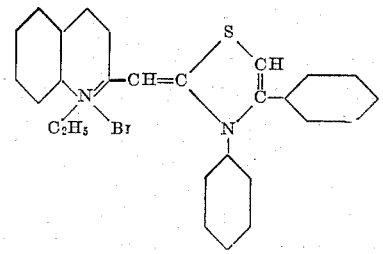

3.06 g. (1 mol.) of 2-(2-anilino-2-thioethylidene)-1-ethyl-1,2-dihydroquinoline and 1 g. (1 mol.) of phenacyl bromide in 10 cc. of ethyl alcohol were heated together at the refluxing temperature for 25 minutes. After chilling at 0° C., the dye was collected on a filter and washed with acetone. The yield of dye was 85 per cent crude and 38 per cent after two recrystallizations from methyl alcohol (13 cc. per gram of dye). The brown crystals had M. P. 272–273° C. with decomposition. They showed some sensitization in a photographic gelatino-silver-chlorobromide emulsion.

*Example 6.—3-ethyl-4-methyl-3',4'-diphenylthiazolocyanine iodide*

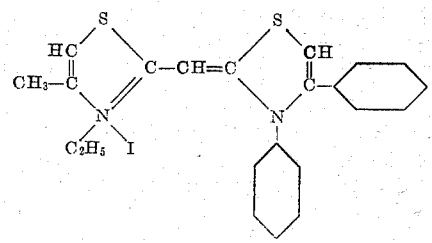

This dye was prepared by the procedure shown in Example 5 from 2-(2-anilino-2-thioethylidene)-3-ethyl-4-methyl-4-thiazoline and phenacyle bromide, except that heating was carried out for but 5 minutes. The cool reaction mixture was then stirred with 3 successive portions of diethyl ether. The dye was then collected on a filter and washed with diethyl ether. The washed dye (in the form of the bromide) was dissolved in a small volume of methyl alcohol and to the methyl alcohol solution was added a hot aqueous solution of sodium iodide. The resulting mixture was chilled, the dye (in the form of the iodide) collected on a filter and washed with water. The washed dye was stirred with hot acetone and the acetone mixture chilled. The dye was filtered from the chilled acetone mixture and washed with acetone. After two recrystallizations from methyl alcohol, the brownish yellow crystals had M. P. 222–223° C. with decomposition. The dye gave a greenish yellow solution in methyl alcohol.

*Example 7.—3-methyl - 3',4' -diphenylthiazolinothiazolocyanine perchlorate*

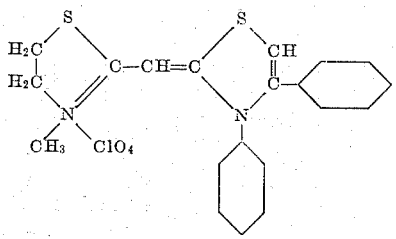

This dye was prepared by the procedure shown in Example 5 from 2-(2-anilino-2-thioethylidene)-3-methylthiazolidine and phenacyl bromide, except that heating was carried out for 6 minutes. The cool reaction mixture was stirred with diethyl ether. The dye-bromide separated out and was collected on a filter where it was washed with considerable diethyl ether and finally with a little acetone. The washed dye-bromide was dissolved in a small volume of methyl alcohol and to that solution was added a hot aqueous solution of sodium perchlorate. Crystals of the above-formulated dye formed at once. The mixture was cooled, the dye filtered off and washed with water and then with a small volume of ethyl alcohol. The dye was twice recrystallized from methyl alcohol and obtained as cream-colored needles melting at 204 to 206° C. with decomposition. The methyl alcohol solution of the dye was almost colorless.

*Example 8.—1,3,3-trimethyl-3',4'-diphenylindothiazolocyanine iodide*

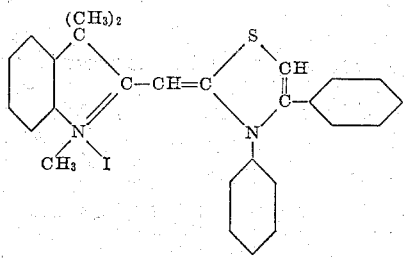

This dye was prepared by the procedure shown in Example 5 from 2-(2-anilino-2-thioethylidene)-1,3,3-trimethylindoline and phenacyl bromide, except that heating was carried out for 5 minutes. The cooled reaction mixture was stirred with 3 successive portions of diethyl ether. The dye-bromide was collected on a filter and washed with diethyl ether. The washed dye was dissolved in hot methyl alcohol and to that solution was added a hot aqueous solution of sodium iodide. After chilling the resulting mixture, the dye-iodide was collected on a filter and washed with water. The water-washed product was stirred with hot acetone and the mixture cooled. The dye was filtered off and washed with acetone. The dye was twice recrystallized from methyl alcohol and obtained as golden-yellow crystals, melting at 204 to 205° C. with decomposition. The methyl alcohol solution of the dye was yellow.

*Example 9.—1'-methyl-3,4-diphenylthiazolo-4'-cyanine iodide*

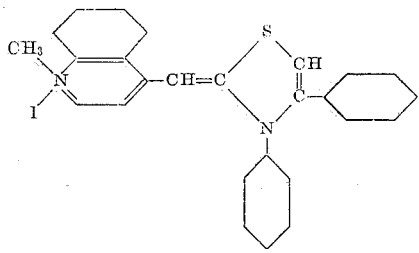

This dye was prepared by the procedure shown in Example 5 from 4-(2-anilino-2-thioethylidene)-1-methyl-1,4-dihydroquinoline and phenacyl bromide, except that heating was carried out for 5 minutes. The cool reaction mixture was stirred with 3 successive portions of diethyl ether. The dye-bromide was collected on a filter and washed with diethyl ether. The washed dye was stirred with acetone, cooled, the dye filtered off and washed with acetone. The dye was dissolved in hot methyl alcohol and to the hot solution was added a hot aqueous solution of potassium iodide. The resulting mixture was chilled, the dye-iodide filtered off and washed with water and then with acetone. The dye was twice recrystallized from methyl alcohol and obtained as red crystals having a golden reflex and melting at 301 to 303° C. with decomposition. The methyl alcoholic solution of the dye was pink.

*Example 10.—5'-carboxymethyl-3-ethyl-3',4'-diphenylthiathiazolocyanine bromide*

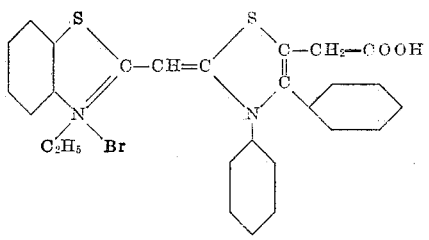

This dye was prepared by the procedure shown in Example 5 from 2-(2-anilino-2-thioethylidene)-3-ethylbenzothiazoline and β-bromo-β-benzoylpropionic acid, except that heating was carried out for 4 minutes. The dye separated from the hot reaction mixture. After chilling the reaction mixture, the dye was collected on a filter and washed with ethyl alcohol. The washed dye was stirred with warm acetone and filtered from the warm acetone. The dye was twice recrystallized from methyl alcohol. It was obtained as pale yellow crystals which reddened and decomposed with evolution of gas when heated to about 175° C. The methyl alcohol solution of the dye was greenish yellow.

In a manner similar to that illustrated in the foregoing examples any of the halogenoketones of Formula II can be condensed with any of the 2-arylamino - 2 - thioethylidene compounds represented by Formula III to give still other of our N-arylthiazolo monomethine cyanine dyes.

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proved satisfactory as a solvent for our new dyes. Ethyl alcohol or acetone may also be employed where the solubility of the dyes in methanol is lower than desired.

Sensitization by means of our new dyes is, of course, primarily directed to the ordinarily employed gelatino - silver - halide developing - out emulsions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With finer-grain emulsions, such as some of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in a solution of the dye, in an appropriate solvent. Bathing methods, however, are not to be preferred ordinarily.

What we claim as our invention and desire to be secured by Letters Patent of the United States of America is:

1. A process for preparing N-arylthiazolo monomethine cyanine dye comprising heating an α-halogenoketone selected from those represented by the following general formula:

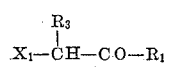

wherein $X_1$ represents a halogen atom, $R_1$ represents a member selected from the group consisting of an alkyl group and an aryl group and $R_3$ represents a member selected from the group consisting of a hydrogen atom, an alkyl group and an aryl group, with a compound selected from those represented by the following two general formulas:

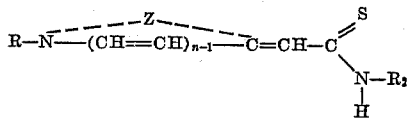

and

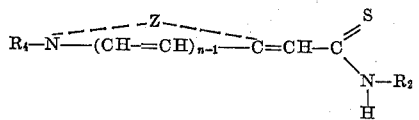

wherein R represents an alkyl group, $n$ represents a positive integer of from 1 to 2, $R_2$ and $R_4$ each represent an aryl group, Z represents the non-metallic atoms necessary to complete a heterocyclic nucleus selected from the group consisting of heterocyclic nuclei of benzothiazole series, heterocyclic nuclei of the benzoselenazole series, heterocyclic nuclei of the α-naphthathiazole series, heterocyclic nuclei of the β-naphthothiazole series, heterocyclic nuclei of the quinoline series, heterocyclic nuclei of the thiazoline series, heterocyclic nuclei of the thiazole series and heterocyclic nuclei of the 3,3-dimethylindolenine series, and $Z_1$ represents a member selected from the group consisting of heterocyclic nuclei of the benzothiazole series and heterocyclic nuclei of the thiazoline series.

2. The process for preparing a N-arylthiazolo monomethine cyanine dye comprising heating phenacyl bromide with a compound selected from those represented by the following general formula:

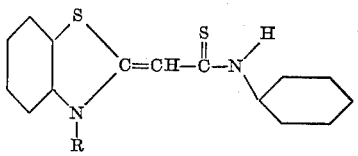

wherein R represents a primary alkyl group of the formula $C_mH_{2m+1}$ wherein $m$ represents a positive integer of from 1 to 4.

3. The process for preparing 3-ethyl-3',4'-diphenylthiathiazolocyanine bromide comprising heating phenacyl bromide with 2-(2-anilino-2-thioethylidene)-3-ethylbenzothiazoline.

4. The process for preparing a N-arylthiazolo monomethine cyanine dye comprising heating phenacyl bromide with a compound selected from those represented by the following general formula:

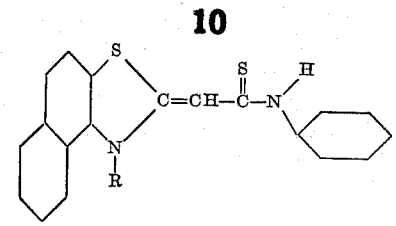

wherein R represents a primary alkyl group of the formula $C_mH_{2m+1}$ wherein $m$ represents a positive integer of from 1 to 4.

5. The process for preparing 3-ethyl-3',4'-diphenyl - 4,5 - benzothiathiazolocyanine bromide comprising heating 2-(2-anilino-2-thioethylidene)-1-ethyl-β-naphthothiazoline with phenacyl bromide.

6. The process for preparing a N-arylthiazolomonomethine cyanine dye comprising heating phenacyl bromide with a compound selected from those represented by the following general formula:

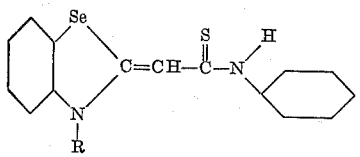

wherein R represents a primary alkyl group of the formula $C_mH_{2m+1}$ wherein $m$ represents a positive integer of from 1 to 4.

7. The process for preparing 3-ethyl-3',4'-diphenylselenathiazolocyanine bromide comprising heating phenacyl bromide with 2-(2-anilino-2-thioethylidene)-3-ethylbenzoselenazoline.

LESLIE G. S. BROOKER.
FRANK L. WHITE.

REFERENCES CITED

The following references are of record in the file of this patent:

UNITED STATES PATENTS

| Number | Name | Date |
|---|---|---|
| 2,079,376 | Middleton | May 4, 1937 |
| 2,143,839 | Brooker | Jan. 17, 1939 |
| 2,264,870 | Beaver | Dec. 2, 1945 |
| 2,464,785 | Thompson | Mar. 22, 1949 |

FOREIGN PATENTS

| Number | Country | Date |
|---|---|---|
| 710,748 | Germany | Sept. 1941 |

OTHER REFERENCES

Schneider: Berichte der deut. Chem. Gesell., vol. 57, pp. 522–532.